June 22, 1954 M. E. CROST 2,682,045

ELECTRICAL MEANS FOR CONVERTING COORDINATES

Filed May 28, 1952

INVENTOR.
MUNSEY E. CROST

BY Harry M. Saragovitz
Attorney

Patented June 22, 1954

2,682,045

UNITED STATES PATENT OFFICE 2,682,045

ELECTRICAL MEANS FOR CONVERTING COORDINATES

Munsey E. Crost, Asbury Park, N. J., assignor to the United States of America as represented by the Secretary of the Army Application May 28, 1952, Serial No. 290,613

5 Claims. (Cl. 340—324)

(Granted under Title 35, U. S. Code (1952), sec. 266)

The invention described herein may be manufactured and used by or for the Government for governmental purposes, without payment of any royalty thereon.

This invention relates to position indicating means and more particularly to electrical means for converting arbitrary figures on a planar surface into their cartesian or plane-rectangular coordinates.

In position indicating devices, it is highly advantageous to provide a simple, yet accurate, means for deflecting an electron beam in the same pattern as drawn arbitrarily by an external pen or stylus along a predetermined plane. In presenting the arbitrary position of the external pen or stylus on an electronic indicating device, such as a cathode-ray tube, it is desirable to convert the arbitrary patterns into their cartesian coordinates.

It is an object of the present invention to provide electrical means for deriving the rectangular coordinates of the arbitrary position of a pen or stylus.

It is another object of the present invention to provide a pair of voltages commensurate with the magnitudes of the rectangular coordinates of the arbitrary position of a pen or stylus on a plane surface.

In accordance with the present invention, the device for converting the arbitrary position of a stylus into its plane-rectangular coordinates comprises a pair of resolvers, each of said resolvers including a rotatable shaft, a rotor winding mounted on said rotatable shaft, and two stator windings adapted to produce output voltages proportional to the sine and cosine of the relative angular displacement of the shafts. The device includes pantograph assembly means for translating the arbitrary position of the stylus to the resolver shafts whereby the relative angular displacements of said resolver shafts are functions of the plane-rectangular X and Y coordinates of said arbitrary position with respect to a predetermined origin. The device also includes means for combining the sine voltage output of one of said resolvers and the cosine voltage output of the other resolver to produce a first potential having a magnitude proportional to the X coordinate and means for combining the remaining cosine voltage output of one of said resolvers and the remaining sine voltage output of the other resolver to produce a second potential having a magnitude proportional to the Y coordinate. The device further includes means for indicating the position of the stylus with respect to its X and Y coordinates.

For a better understanding of the invention together with other and further objects thereof, reference is had to the following description taken in connection with the accompanying drawing in which.

Figure 1:
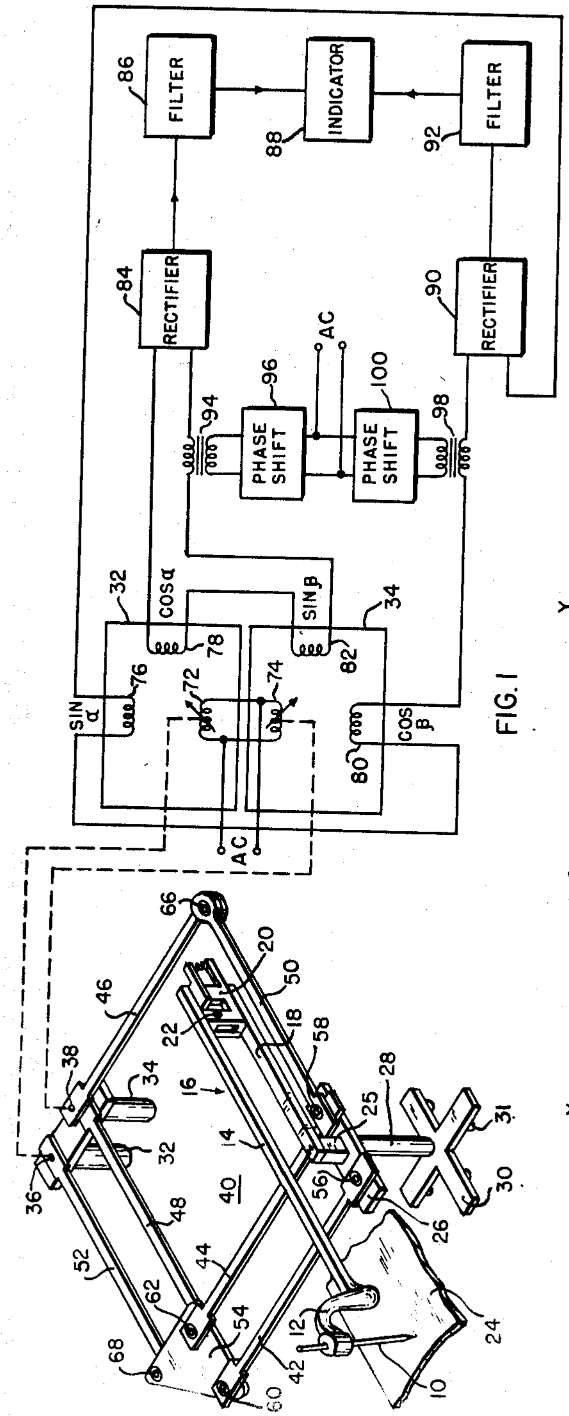
Figure 1 is a schematic diagram of a system embodying my invention.

Referring now to Figure 1 of the drawing, there is shown at 10 a pen or stylus rigidly mounted in one end of a goose neck structure 12 affixed to the free end of upper arm 14 of yoke member 16. Upper arm 14 is arranged substantially parallel to lower arm 18 of yoke member 16 and is spaced therefrom by U-shaped member 20, the base of which is affixed to one end of said lower arm. Upper arm 14 is substantially longer than lower arm 18 and may be pivotally mounted on one arm of U-shaped member 20 by means of a spring loaded pivot 22. By this arrangement, the point of stylus 10 may readily be applied to a planar writing surface 24 without affecting the horizontal position of lower arm 18. The other end of lower arm 18 is affixed to post 25 extending upwardly from and centrally positioned in horizontal support member 26 which is supported in a plane parallel to writing surface 24 by means of a rod 28 extending upwardly from cross-foot assembly 30. As shown, cross-foot assembly 30 is provided with non-directional bearings or castors 31 so that it is free to move along a plane parallel to writing surface 24 as stylus 10 is arbitrarily positioned along said writing surface. At 32 and 34 there are provided a pair of sine and cosine resolvers, which will be described later, having their rotatable shafts 36 and 38, respectively, displaced along the X axis (see Figure 2) by a predetermined fixed distance D. Hereinafter resolver 32 will be designated as the $\alpha$ resolver and resolver 34 will be designated as the $\beta$ resolver. The significance of $\alpha$ and $\beta$ will be explained hereinbelow.

The motion of stylus 10 is communicated to the rotatable shafts of resolvers 32 and 34 by means of a pantograph assembly 40 comprising six equal length arms 42, 44, 46, 48, 50 and 52. Parallel arms 42 and 44 are spaced a distance equal to D and are terminated in horizontal support member 26 and in junction plate 54. The ends of each of said arms are provided with race bearings rotatably mounted on axially aligned pivots 56 and 58 in support member 26 and axially aligned pivots 60 and 62 in junction plate 54. By this arrangement arms 42 and 44 are maintained parallel at all times. The spacing of arms 42 and 44 is not critical and any other suitable spacing may be utilized so long as they are maintained parallel to each other at all times.

Arm 46 is arranged parallel to arms 42 and 44 and is spaced therefrom by spaced parallel arms 48 and 50 which are arranged parallel to arm 52. The terminals of arm 48 are provided with respective race bearings rotatably mounted on shaft 38 of $\beta$ resolver 34 and pivot 62 in junction plate 54. One end of arm 46 is affixed to rotatable shaft 38 of $\beta$ resolver 34 by any suitable means and the other end of arm 46 is terminated by a race bearing rotatably mounted on junction pivot 66. The terminals of arm 50 are provided with race bearings, one of which is rotatably mounted on junction pivot 66 and the other is rotatably mounted on pivot 58 extending upwardly from horizontal support member 26. One end of arm 52 is affixed to rotatable shaft 36 of $\alpha$ resolver 32 and the other end thereof is provided with a race bearing rotatably mounted on pivot 68 in junction plate 54. Pivots 62 and 68 in junction plate 56 are axially aligned and are so arranged that the line connecting said pivots and the line connection pivots 60 and 62 form a 90° angle (Figure 2) to preserve the orientation with respect to the Y axis. By this arrangement, the direction of yoke 16 is kept parallel to itself throughout the motion of writing stylus 10.

Figure 3A:
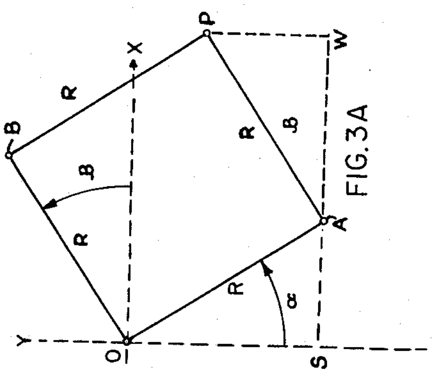
Figures 3A and 3B are diagrams illustrative of certain trigonometric relationships utilized in carrying out the invention.
Figure 3B:
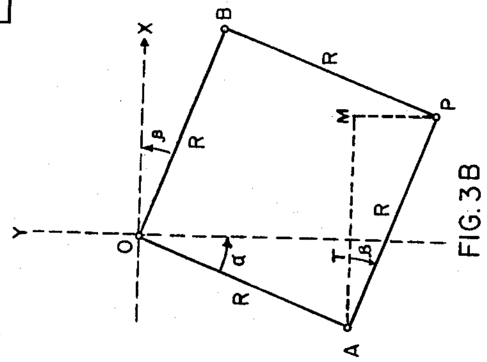

At this point, it would be advisable to discuss the relationship between the angular position of resolver shafts 36 and 38, designated as $\alpha$ and $\beta$, respectively, and the rectangular coordinates of an arbitrary position of pen or stylus 10. Referring now to Figures 3A and 3B, parallelogram OAPB may be assumed to be pivoted at O which represents the origin of coordinate axes X and Y, and P may be assumed to be the arbitrary position of the writing pen 10. By inspection of Figures 3A and 3B, it is apparent that the pen's position may be determined by the following plane-rectangular coordinates:

$$(1)\qquad X=R\ (\sin\alpha+\cos\beta)$$
$$(2)\qquad Y=R\ (\sin\beta-\cos\alpha)$$

where R equals the length of each arm of the parallelogram; $\alpha$ is the angle between arm OA and the Y axis; and $\beta$ is the angle between arm OB and the X axis. It is to be assumed that the angles are measured in the counterclockwise direction, so that in Figure 3A angles $\alpha$ and $\beta$ are considered to be positive and in Figure 3B, angles $\alpha$ and $\beta$ are considered to be negative. Thus, in deriving Equations 1 and 2 the sign of the angles $\alpha$ and $\beta$ must be taken into account and the following trigonometric relationships must be assumed:

$$(3)\qquad \sin(-\alpha)=-\sin\alpha \text{ and } \cos(-\alpha)=\cos\alpha$$
$$(4)\qquad \sin(-\beta)=-\sin\beta \text{ and } \cos(-\beta)=\cos\beta$$

In Figure 3B, $\alpha$ and $\beta$ by defintion have negative values and, to better illustrate how Equations 1 and 2 are derived, $\overline{AM}$ and $\overline{PM}$ are lines drawn parallel to the X and Y axes respectively. Now, from Equations 3 we have $$(5)\qquad -R\sin\alpha=\overline{AT}$$
$$(6)\qquad R\cos\alpha=\overline{OT}$$

and from Equations 4 we have $$(7)\qquad -R\sin\beta=\overline{MP}$$
$$(8)\qquad R\cos\beta=\overline{AM}$$

It is readily apparent from Figure 3B that rectangular coordinate $X=\overline{AM}-\overline{AT}$ and rectangular coordinate $Y=-(\overline{OT}+\overline{MP})$. Now, by substituting the appropriate values for $\overline{AM}$ and $\overline{AT}$ from Equations 5 and 6 and for $\overline{OT}$ and $\overline{MP}$ from Equations 7 and 8, we have the relationships shown in Equations 1 and 2. These same relationships hold true for Figure 3A where $\alpha$ and $\beta$ have positive values; $X=\overline{SA}+\overline{AW}$, and $$Y=\overline{OS}+\overline{WP}$$

Figure 2:
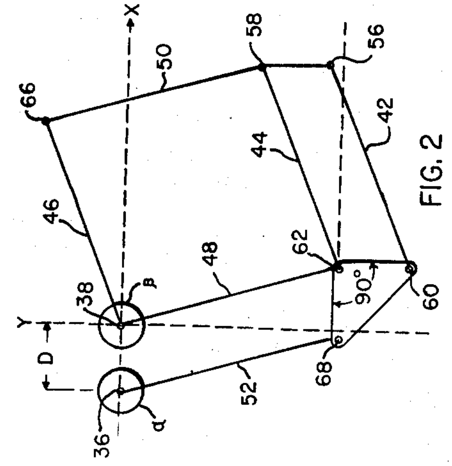
Figure 2 is a schematic representation of the pantograph assembly of Figure 1.

Similarly, it can be shown that the relationship of Equations 1 and 2 holds true for position P in any quadrant provided the assumed directions of the angles are taken into account. In Figures 1 and 2, arm 46 controls the angular position of shaft 38 of $\beta$ resolver 34 and corresponds to OB of Figure 3, and arm 52 controls the angular position of shaft 36 of $\alpha$ resolver 32 and corresponds to OA of Figure 3.

Sine and cosine resolvers are devices well known in the art in which a voltage output is produced proportional to the sine and cosine of the angular movement of a shaft. In one type of resolver, the shaft carries a rotor winding which rotates inside a pair of stator windings, the windings being so related that rotation of the shaft varies the coupling therebetween in a manner to produce the desired sine and cosine output. The stator windings are provided with separate output terminals and are so positioned with respect to each other that when an alternating current of sinusoidal wave shape passes through the rotor winding and the rotor is turned on its bearings, the voltage induced in one stator winding is a maximum when the voltage in the other is zero, and vice versa. If the angular rotation is zero when the induced voltage amplitude in one stator winding is zero, the voltage output from this stator winding is proportional to the sine of the angle, and the voltage of the output from the other stator winding is proportional to the cosine of the angle. It is to be understood, of course, that other suitable resolvers may be utilized. For example, two rotor output windings may be utilized with one input stator winding to achieve the same result.

Rotatable shafts 36 and 38 in Figure 1 are represented as dashed lines driving the rotors 72 and 74 of resolvers 32 and 34, respectively. An A.-C. reference voltage is applied to said rotors from any suitable source. As shown, resolver 32 is provided with two stator windings 76 and 78, stator winding 76 being arranged to produce a sine voltage output and stator winding 78 being arranged to produce a cosine voltage output. Thus the output of the stator winding 76 is proportional to sine $\alpha$ and that of stator winding 78 is proportional to cosine $\alpha$. Similarly, resolver 34 is provided with two stator windings 80 and 82, the output of stator winding 80 being proportional to cosine $\beta$ and that of stator winding 82 being proportional to sine $\beta$.

In Equations 1 and 2, it can be seen that the length R is merely a scale factor and therefore may be replaced by any suitable constant, and for convenience this scale factor may be replaced by $E$ sin $\omega t$, the voltage output of the resolver stators at the angle of maximum output. Thus, Equations 1 and 2 may be written as follows:

(9) $X=E \sin \omega t(\sin \alpha + \cos \beta)$

(10) $Y=E \sin \omega t(\sin \beta - \cos \alpha)$

The stators of the resolvers may be so oriented with respect to the rotors that when arm 46 is parallel to the X axis, resolver 34 measures angle $\beta$ as zero, and when arm 52 is parallel to the Y axis, resolver 32 measures angle $\alpha$ as zero. With arms 46 and 52 thus arranged, the outputs of the resolvers are E and —E and such a point may be considered to be the initial, or starting position, of the pen or stylus 10, preferably at the center of writing surface 24.

Sine stator winding 76 of resolver 32 is connected in series with cosine stator winding 80 of resolver 34 in such a manner that the voltage impressed across the output of the series connection is equal to the expression $E$ sin $\omega t(\sin \alpha + \cos \beta)$. Similarly, cosine stator winding 78 of resolver 32 is connected in series with sine stator winding 82 of resolver 34 in such a manner that the voltage impressed across the output of the series connection is equal to the expression $E \sin \omega t(\sin \beta - \cos \alpha)$. The alternating voltage output from serially connected stator windings 82 and 78 is applied to a rectifier 84, the direct-current voltage output of which may be applied to an indicator 88 through filter network 86. In a similar manner, the alternating voltage output from serially connected stator windings 76 and 80 is supplied to a rectifier 90, the direct-current voltage output of which may be applied to indicator 88 through filter network 92. Indicator 88 may be any conventional cathode-ray tube having the usual horizontal and vertical deflection plates. The direct-current voltage outputs from rectifiers 84 and 90 are respectively applied to the vertical and horizontal deflection plates and the face of the cathode-ray tube may be suitably calibrated in terms of rectangular coordinates X and Y. Since such indicators are well known in the art no further description thereof is believed necessary. Thus, it can readily be seen that by this arrangement the direct-current output voltages from rectifiers 84 and 90 correspond to the plane-rectangular coordinates X and Y of stylus 10. It is to be understood, of course, that the parameters of the output circuits of the resolvers are so chosen that the current flow in the output circuits does not appreciably affect the output voltage of any resolver winding.

A large amount of filtering, with attendant high time constant, is desirable in order to remove the alternating current component of the rectified output voltage. However, this limits the speed at which the output voltage can respond to the motion of stylus 10. As a result, a compromise must be made between filter efficiency and writing speed. For example, resolvers operating at a frequency of higher than 60 cycles may be preferable.

When angles $\alpha$ and $\beta$ pass through zero, it is apparent from Figure 3 that the sines of the angle change algebraic signs, since sine $(-\alpha)$ equals —sine $\alpha$. Thus, as $\alpha$, for example, changes from positive (Figure 3A) to negative (Figure 3B) the amplitude function E sin $\alpha$ changes sign accordingly. Since this change in amplitude sign is recognizable only as a change in phase in the output alternating voltage from the resolvers, the rectifiers 84 and 90 cannot distinguish between the two, and, as a result, there may be an ambiguity in the correct determination of the rectangular coordinates derived from the rectifiers. If, for example, the output of the $\beta$ cosine winding is greater than the output voltage of the $\alpha$ sine winding, then the alternating output voltages will add properly before they are applied to the associated rectifier and thus the direct-current output voltage therefrom will properly designate the X-rectangular coordinate. However, when, for example, sine $\alpha$ and cosine $\beta$ are of opposite sign and sine $\alpha$ becomes greater than cosine $\beta$, then the sum of the output alternating voltages from the resolvers must be corrected before it is applied to its associated rectifier.

In order to prevent such erroneous direct-current readings due to the change in algebraic sign as the angles $\alpha$ and $\beta$ pass through zero, a constant amplitude alternating voltage having the same frequency and phase as the alternating current input voltage applied to rotors 72 and 74 is provided in series with each of the serially connected stator windings. As shown in Figure 1, this correction voltage is applied in series with one of the output leads of serially connected stators windings 78 and 82 by a transformer 94 having its secondary winding in series with the serially connected stator windings and its primary connected to an A.-C. source through a conventional phase shifting network 96. An identical correction voltage is applied in series with one of the output leads of serially connected stator windings 76 and 80 by transformer 98 having its secondary winding in series with said stator windings and its primary winding connected to an alternating current source through a conventional phase shifting network 100. Phase shift networks 96 and 100 are provided to compensate for the inherent phase shift in the resolvers caused by the inclusion of an air gap between the iron cores of the rotor and stator. The amplitude of this correcting voltage must be such that the complete sum never changes sign throughout the allowed range of variation of the angles.

It is to be understood, of course, that if the motion of stylus 10 is confined to any single quadrant, for example the fourth quadrant, with respect to X and Y axes so that neither X nor Y changes in sign, then the correction voltages as described hereinabove will not be required.

As mentioned hereinabove, it is desirable that stylus 10 be initially at the center of writing surface 24 when angles $\alpha$ and $\beta$ are both zero. At this point, the direct-current voltage outputs of rectifiers 84 and 90 should be zero. This may be accomplished when $\alpha$ and $\beta$ are both zero in a conventional manner by inserting a predetermined direct current voltage having a polarity opposite to that from the output of rectifiers 84 and 90, respectively, at the output of the respective filters.

While there have been described what at present are considered to be the preferred embodiments of the invention, it will be understood by those skilled in the art that various changes and modifications may be made herein without departing from the invention, and it is, therefore, aimed in the appended claims to cover all such modifications and changes as fall within the spirit and scope of the invention.

What is claimed is:

1. In combination; a position marking means; a first resolver having a rotor winding mounted on a rotatable shaft and two stator windings adapted to produce output voltages proportional to the sine and cosine of the relative angular displacement of said shaft; a second resolver having a rotor winding mounted on a rotatable shaft and two stator windings adapted to produce output voltages proportional to the sine and cosine of the relative angular displacement of said second resolver shaft; pantograph assembly means for translating the planar motion of said position marking means to said first and second resolver shafts whereby the relative angular displacements of said first and second resolver shafts are determined by the plane-rectangular X and Y coordinates of said position marking means with respect to a predetermined origin; means for combining the sine voltage output of said first resolver and the cosine voltage output of said second resolver to produce a first alternating current potential having a magnitude proportional to said X coordinate; means for combining the cosine voltage output of said first resolver and the sine voltage output of said second resolver to produce a second alternating current potential having a magnitude proportional to said Y coordinate; means for rectifying said first and second alternating current potentials: and means responsive to the rectified potentials for indicating the position of said position marking means with respect to its X and Y coordinates.

2. The device set forth in claim 1 wherein said pantograph assembly comprises a support member; means for maintaining said support member in a predetermined plane substantially parallel to a planar writing surface; a junction plate substantially co-planar with said support member; a first pair of spaced parallel arms disposed intermediate said junction plate and said support member having its respective terminals linearly aligned and rotatably mounted on said junction plate and said support member; a second pair of parallel arms disposed intermediate said resolver shafts and said junction plate, the terminals of one arm of said second parallel pair being rotatably mounted on said second resolver shaft and said junction plate respectively, the terminals of the other arm of said second parallel pair being affixed to said first resolver shaft and rotatably mounted on said junction plate respectively; the junction plate terminals of said second parallel pair of arms being linearly aligned and at right angles to the linearly aligned terminals in said junction plate of said first parallel pair of arms; a third arm parallel to said first parallel pair of arms and having one of its terminals affixed to said second resolver shaft; a fourth arm parallel to said second parallel pair of arms and having its terminals rotatably mounted on the other end of said third arm and in said support member respectively; all of the arms in said pantograph assembly being of equal length; and means for mounting said position marking means on said support member intermediate said first pair of parallel arms whereby said arms are maintained in said predetermined plane.

3. In combination; a position marking means; a first resolver having a rotor winding mounted on a rotatable shaft and two stator windings adapted to produce output voltages proportional to the sine and cosine of the relative angular displacement of said shaft; a second resolver having a rotor winding mounted on a rotatable shaft and two stator windings adapted to produce output voltages proportional to the sine and cosine of the relative angular displacement of said second resolver shaft; pantograph assembly means for translating the planar motion of said position marking means to said first and second resolver shafts; the relative angular displacements of said first and second resolver shafts being determined by the plane-rectangular X and Y coordinates of said position marking means with respect to a predetermined origin; the sine and cosine stator windings of said first resolver being respectively connected in series with the cosine and sine stator windings of said second resolver to produce discrete output voltages proportional to said X and Y coordinates; means for rectifying said discrete output voltages; and means responsive to the rectified voltage for indicating the position marking means with respect to its X and Y coordinates.

4. In combination; a position marking means; a first resolver having a rotor winding mounted on a rotatable shaft and two stator windings adapted to produce output voltages proportional to the sine and cosine of the relative angular displacement of said shaft; a second resolver having a rotor winding mounted on a rotatable shaft and two stator windings adapted to produce output voltages proportional to the sine and cosine of the relative angular displacement of the rotatable shaft of said second resolver; said resolver shafts being spaced from each other a predetermined distance and axially aligned; pantograph assembly means for translating the planar motion of said position marking means to said first and second resolver shafts whereby the relative angular displacements of said resolver shafts are determined by the plane-rectangular X and Y coordinates of said arbitrary position, said rectangular coordinates having their origin at the position of one of said shafts; means for combining the sine voltage output of said first resolver and the cosine voltage output of said second resolver to produce a first alternating current potential having a magnitude proportional to said X coordinate; means for combining the cosine voltage output of said first resolver and the sine voltage output of said second resolver to produce a second alternating current potential having a magnitude proportional to said Y coordinate; means for rectifying said first and second alternating current potentials; and means responsive to the rectified voltage for indicating the position of said marking means with respect to its X and Y coordinates.

5. In combination; a stylus, a pair of resolvers; each of said resolvers having a rotatable shaft, rotor winding mounted on said rotatable shaft, and at least two stator windings; a source of voltage applied to each of said rotor windings; pantograph assembly means for translating the planar motion of said stylus to said shafts whereby the movement of said stylus controls the relative angular displacements of said shafts; one pair of said stator windings being so arranged and constructed with respect to its associated rotor winding to produce discrete sine and cosine voltage outputs dependent upon the angular position of one of said shafts, the other pair of said stator windings being so arranged and constructed with respect to its associated rotor winding to produce discrete sine and cosine voltage outputs dependent upon the angular position of the other of said shafts; means for combining the sine output voltage from one pair of stator windings and the cosine voltage output from the other pair of stator windings to produce a first alternating current voltage having a magnitude proportional to the distance of said stylus from a predetermined origin in a given direction; means for combining the cosine voltage output from said one pair of stator windings and the sine voltage output from said other pair of stator windings to produce a second alternating current voltage having a magnitude proportional to the distance of said stylus from said predetermined origin in a direction perpendicular to said given direction; means for rectifying said first and second alternating current voltages; said rectified voltages being proportional to the coordinates of said position marking means along said given direction and said perpendicular direction with respect to said predetermined origin.

References Cited in the file of this patent

UNITED STATES PATENTS

| Number | Name | Date |
|---|---|---|
| 2,413,300 | Dunn et al. | Dec. 31, 1946 |
| 2,583,535 | Adler | Jan. 29, 1952 |